Sept. 5, 1950 P. W. GARBO 2,520,925
GENERATION OF SYNTHESIS GAS
Filed Jan. 22, 1947 2 Sheets-Sheet 2
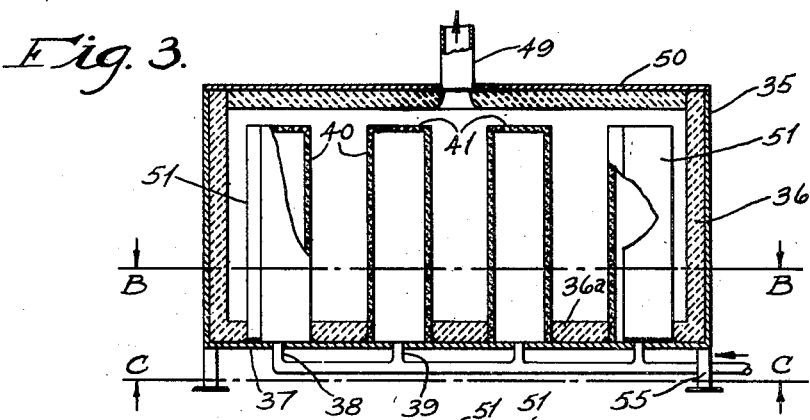
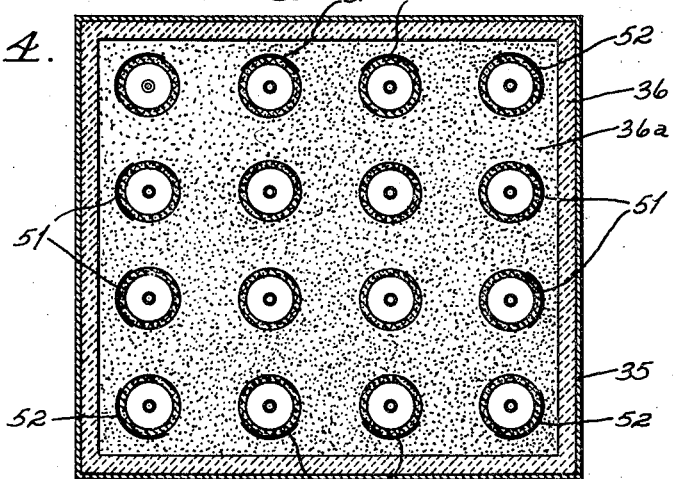
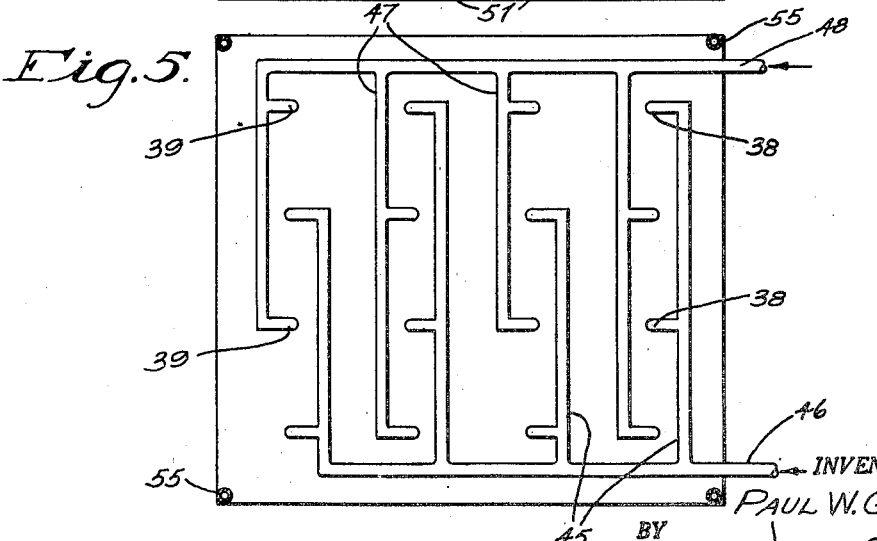
INVENTOR.
PAUL W. GARBO
BY
ATTORNEY

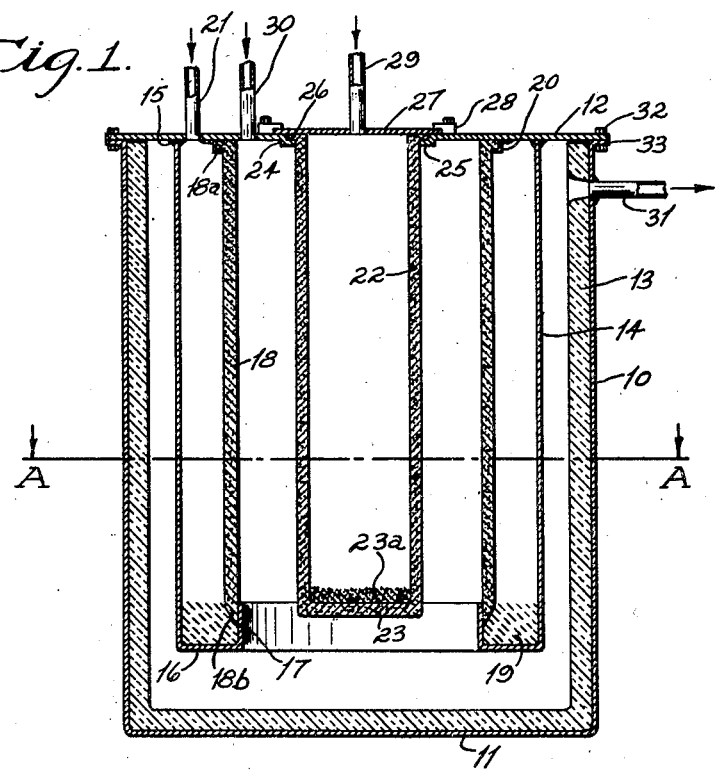
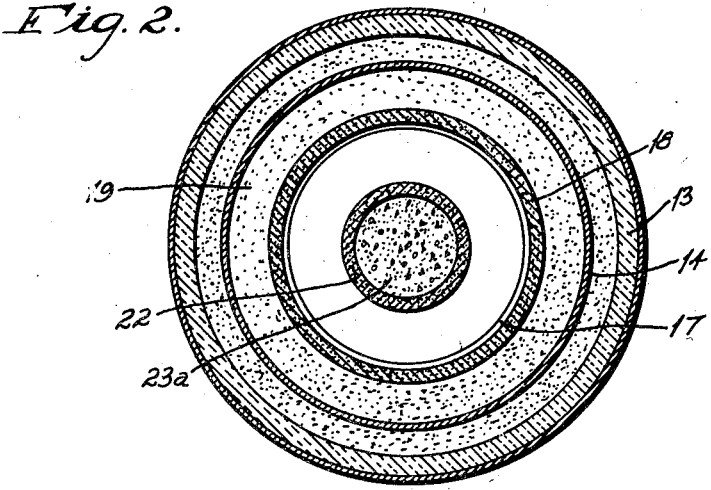

UNITED STATES PATENT OFFICE 2,520,925

GENERATION OF SYNTHESIS GAS

Paul W. Garbo, Freeport, N. Y., assignor to Hydrocarbon Research, Inc., New York, N. Y., a corporation of New Jersey Application January 22, 1947, Serial No. 723,547

11 Claims. (Cl. 48—212)

The present invention relates to the generation of gas and is more particularly concerned with the generation of essentially hydrogen-carbon monoxide mixtures.

Such mixtures have wide utility and are of particular significance as a feed stock in the catalytic manufacture of hydrocarbons wherein the hydrogen catalytically reduces the carbon monoxide to multi-carbon atom hydrocarbons. The feed gas is conventionally known in the art as "synthesis gas" and this term will hereinafter for purposes of convenience be employed to designate the products of gas generation irrespective of their intended use.

While synthesis gas may be generated from a number of source materials, the present invention concerns more particularly its production by the interaction of a gaseous hydrocarbon and oxygen, alone as well as in combination with carbon dioxide or water vapor or both. The reaction may be carried out in the presence of a catalyst or not but in either case it has been found that relatively high temperatures and maintenance of relatively uniform reaction conditions are advisable if there is to be a good quantitative conversion to hydrogen and carbon monoxide. Introduction of the reactants in separate streams into a generation zone tends, inherently, to result in variations throughout the zone depending upon the progress of mixing of the reactants, the portion of the zone required for mixing, the variation in the rate of reaction in different parts of the zone, and numerous other factors. It has been proposed to use various methods of premixing, but this introduces the hazard inherent in handling explosive mixtures of gases. It has furthermore been proposed to direct the reactants upon a refractory material suitable for surface combustion, and in one instance, to oppositely introduce the reactants to a packed mass of refractory. In such case, however, the recovery of the products of combustion from the packed area without impairing the reaction constitutes a serious problem which is of increasing disadvantage where the process is to be operated to convert large volumes of gas on a commercial scale.

In accordance with the present invention, it has been discovered that the hydrocarbon gas may be caused to react with oxygen in apparatus of moderate size and at a high rate of production where the reactant gases are separately supplied through spaced distributing walls or barriers having outer faces set in an opposed spaced relation and with the reaction or generation space therebetween free of packing. More particularly, the hydrocarbon gas is supplied to the interior surface of a porous distributing barrier through which it passes and is liberated on the exterior surface thereof. Oppositely disposed in spaced relation to the first named barrier is a second distributing barrier through which high-purity oxygen, for example, passes and is more or less uniformly liberated on the outer surface. The two outer surfaces are in spaced, facing relationship so that the two reactants feed into the reaction zone in effect from opposite sides thereof. Surprisingly, reaction may be caused to proceed apparently by surface combustion in the absence of an interior packing and the product gases may be continuously withdrawn whereby to provide a continuously operating generator wherein gas generation proceeds under substantially uniform reaction conditions.

By the term "distributing barrier or wall" as used herein is meant a wall capable under the influence of diffusion or of a positive pressure differential, of passing a gas more or less uniformly from one face to the other. Such may most conveniently be formed of a porous refractory material through which gases readily pass under a positive pressure. The porosity of the wall may be varied within wide limits in accordance with the rate of gaseous feed which it is desired to handle. Refractory members of this type may consist of porous zirconia, magnesia, Alundum, Carborundum or any number of additional refractory materials capable of being formed into rigid porous shapes, as will occur to those skilled in the art in view of the foregoing. It is, of course, desirable for best operation that the refractory barrier have a more or less uniform porosity through its area so that gas distribution will be relatively uniform.

The invention contemplates the introduction of the gaseous reactants either separately or in separate mixtures individually incapable of propagating a flame to the interior surfaces of the opposed facing wall surfaces of the porous barriers. In short, the opposed surfaces of the porous barriers are separated by a free intervening reaction space, and the respective opposite surfaces of the barriers, herein referred to for convenience as the interior surfaces, are appropriately associated with suitable means for maintaining the inflow of reacting gases separate; in other words a conduit or feeding zone is provided for each reactant stream so that mixture of the two reactant streams can occur only in the region of the reaction or generation space or zone which includes the aforesaid opposed surfaces and the unoccupied space therebetween.

Referring now to the figures of the drawing wherein the invention is more specifically illustrated by reference to actual embodiments thereof;

Fig. 1 shows a more or less diagrammatic sectional view taken vertically through a gas generator embodying the principles of the present invention;

Fig. 2 is more or less diagrammatic horizontal section taken on the line A—A of Fig. 1;

Fig. 3 is more or less diagrammatic vertical section taken through an alternative form of generator;

Fig. 4 is a horizontal section taken on the line B—B of Fig. 3; and

Fig. 5 is a horizontal section taken on the line C—C of Fig. 3.

Referring now to Figs. 1 and 2, the numeral 10 designates the cylindrical side walls of a generator housing or chamber which includes a bottom wall 11 and a top wall 12. The housing is advantageously provided with a suitable layer of insulation 13 in order to conserve the internal heat and maintain a high temperature level suitable for reaction. Although not shown in the figures, the top wall 12 may be also insulated.

Interiorly the chamber is provided with a cylindrical coaxial shell 14 welded or otherwise secured to the top wall 12 as at 15 and depending therefrom to a point spaced from the bottom wall 12. As shown, the cylindrical shell 14 has an inward flange 16 at its lower end, which in turn terminates in a vertically extending flange 17 in spaced relationship to the wall 14.

A porous refractory tube 18 is suspended from the top 12 by a flanged ring 20 fitting snugly against the flange 18a of tube 18. The lower end of the refractory tube 18 is partially embedded in a mass of loose powdered refractory material 19 which provides a seal between tube 18 and flange 17 to prevent undue gas leakage at this point. Some advantage is achieved by tapering the lower edge of the tube 18 as at 18b to facilitate relative movement of parts because of differences in thermal expansion and contraction between shell 14 and tube 18.

It will be observed that the combination of the cylindrical shell 14 and the internal porous tube 18 provides an interior annular space for one reactant stream introduced from any convenient source, not shown, through conduit 21. Any number of inlet conduits may be provided even though only one appears in Fig. 1.

A second cylindrical porous tube 22 is disposed interiorly of the first named porous tube 18, coaxially in spaced relation so that the outer wall of tube 22 is in spaced parallel relation to inner wall of tube 18. The porous tube 22 is more particularly closed at its bottom end as at 23 by a wall area which preferably, though not necessarily, is made non-porous or relatively impermeable to gas, e. g., by applying thereto a layer of refractory cement 23a.

One means for supporting the central porous tube 22 is shown more clearly in Fig. 1 wherein the top wall 12 of the generator is centrally apertured to receive the body of the tube, the margins of the aperture being flanged downwardly as at 24 and terminating in an extending flange 25, thus providing an annular recess for receiving an enlarged annular protuberance or flange 26 formed about the upper margin of the tube 22. The aperture and recess are covered with a circular plate 27, releasably secured to the top wall 12 by means of fasteners 28, and centrally provided with an inlet fitting 29 for introduction of the other reactant stream from any desired source.

Additional inlet means comprising inlet tube 30 is provided for the supply of further reactants to the reaction zone between the two opposed porous surfaces. An outlet tube 31 passing into the upper portion of the cylindrical outer wall 10 of the generator permits withdrawal of the synthesis gas for further use or treatment. Advantageously the top wall 12 of the generator is removably fastened to the side walls 10 by suitable fastening means 32 engaging within an annular outwardly projecting flange 33 formed at the upper margin of the cylindrical wall 10.

In operation of the foregoing device two reactant streams are separately introduced at the inlet pipe 21 and 29. This operation can be best illustrated by assuming that methane is introduced through the former pipe and relatively pure oxygen through the pipe 29. During settled operation, the two streams are continuously introduced at relative rates equivalent to approximately two mols of methane per mol of oxygen. The optimum proportions may be determined by relative adjustment until satisfactory operation is established and the desired product is obtained.

The immediately foregoing remarks refer particularly to settled operation with the reaction zone at reaction temperature. An understanding of the initial operation or start-up is believed beneficial in providing a better understanding of the function of the device. Thus normally, with the generator in cool condition, oxygen is first permitted to flood or sweep through the interior of the generator passing from pipe 29 to the interior of the tube 22, outwardly through the pores thereof to the reaction zone, downwardly and around flange 16 into the outermost annular space, and thence through outlet conduit 31. At this time the flow of the methane is started so as to cause it to pass through the wall 18 into the reaction zone and the two gases are there ignited by any suitable ignition means, e. g., a gas pilot light or an electric spark.

As the reaction zone becomes heated to incandescence, the flow of the respective gaseous streams is adjusted to obtain a synthesis gas of carbon monoxide and hydrogen rather than a flue gas consisting essentially of carbon dioxide and water vapor. From this point on, reaction appears to proceed by a process similar to surface combustion. Both opposed refractory wall surfaces forming the sides of the reaction zone seem to acquire the same elevated temperature and under a relatively uniform rate of passage of each reactant feed through the wall of each porous delivery barrier, the internal reaction space operates at substantially uniform temperature throughout. In other words, while during the initial start-up, large temperature variations exist, after settled operation the opposed refractory walls and the intervening reaction space appear to assume more or less uniform temperature and reaction conditions.

The product gases discharge downwardly about the flange 16 and then pass upwardly between the shell 14 and the outer cylindrical refractory wall 13 of the generator 10 thus additionally preheating the incoming methane before discharging by way of outlet conduit 31.

It is important to note that in addition to the foregoing preheating effect, the incoming gaseous streams, during their passage respectively through the tube 22 and the annular space about the tube 18 are subjected to the preheating effect of the hot porous refractory walls of tubes 22 and 18, respectively. In other words, the incandescent opposed surfaces of the two refractory walls tend to transmit heat energy into the incoming gas streams so that the gases reach the reaction zone in a condition approaching the ideal for the desired reaction.

While the foregoing embodiment has been illustrated in connection with the reaction of methane and oxygen, the invention is not so limited but contemplates the reaction of hydrocarbon gas, by which is meant any gaseous or vaporized hydrocarbons, with any of the conventional gaseous reactants capable of resulting in the generation of a hydrogen-carbon monoxide mixture. More specifically, the hydrocarbons may most advantageously comprise natural gas, which is usually largely methane, but the feed may consist of any of the higher gaseous hydrocarbons such for example as propane, or even normally liquid hydrocarbons which are readily vaporized by preheating.

As indicated above, carbon dioxide or water vapor, or both, may be used in conjunction with oxygen. As is known to those skilled in the art, however, these latter reactants combine with hydrocarbons endothermically in contrast with the exothermic reactions of hydrocarbon and oxygen and accordingly must be limited to quantities which will permit the maintenance of the desired reaction temperature. Generally, the volume of carbon dioxide and/or water vapor is not more than about 15% of the total volume of the reactants entering the generator. In other words, the present system affords an ideal arrangement whereby a portion of the exothermic heat energy from the reaction of a hydrocarbon and oxygen may be used to "carry" the endothermic reaction between the hydrocarbon and carbon dioxide or water vapor. The carbon dioxide and/or water vapor stream is supplied preferably in admixture with the hydrocarbon feed to minimize cracking and carbon formation during the preheating of the hydrocarbon feed. They may also be admixed with the oxygen stream. Another point of introduction is indicated by the inlet tube 30 which supplies these reactants directly to the reaction zone through which they pass from one extremity to the other before being withdrawn from the outlet 31.

Advantageously operation of the foregoing device may be best adjusted by experimentation. As indicated above, the temperature prevailing in the reaction zone is quite an important factor and normally should be maintained above 2000° F., preferably above about 2400° F., for optimum yield and product composition. On the other hand if the refractory surfaces of the generation zone are impregnated with a suitable catalyst for the reaction, as for example, nickel, a somewhat lower temperature may be satisfactory. This modification is also contemplated. Obviously, the proportion of oxygen required to support these temperatures will depend upon the amount of preheat in the reactants, the amount of heat leaks from the generator and the proportion, if any, of carbon dioxide and water vapor in the reactants.

Referring to the alternative embodiment shown in Figs. 3, 4 and 5, the generator chamber takes the form of a rectangular enclosure having side walls 35 and provided with a bottom wall 37. The generator is lined with refractory 36. In the arrangement shown, the bottom wall is provided with a series of inlet conduits 38 and 39 communicating therethrough with the interior of porous refractory tubes 40. It will be seen that each of the porous refractory tubes 40 is closed at its upper end as at 41, which end is preferably impermeable, to provide a cylindrical openended chamber inverted over its respective inlet tube 38 or 39, and capable of being internally supplied with a flow of reactant gas through the inlet tube. The cylindrical refractory members are preferably arranged and supported upon the lower wall 37 of the generator and are secured in place by the layer of refractory 36a on wall 37. In other words, the open ends of the porous refractory tubes seat within respective cylindrical recesses. These refractory members may be cemented to layer 36a or, advantageously may be spaced inwardly from the sides of recesses in layer 36a with the intervening annular space occupied by a loose powdered refractory material of sufficient density to resist displacement by leakage of feed gas therethrough.

From the foregoing it will be apparent that the several refractory tubes provide opposed refractory surfaces to which separate streams of reactant feed gases are supplied from the interior of the tubes, thus filling the intervening and unoccupied reaction space with the gases. So that opposed, facing refractory surfaces will be supplied with complementary reactant streams, each alternate refractory tube is supplied interiorly with a different reactant feed stream. To this end the inlet tubes 38 and 39 are connected as shown more clearly in Fig. 5 where inlet tubes 38 join through intermediate manifolds 45 with a main manifold 46, and the inlet tubes 39 join through intermediate manifolds 47 with a main manifold 48. Accordingly, each alternate porous barrier supplies one reactant feed gas in opposed facing relationship to the reactant feed gas supplied by the opposed surfaces of the adjacent porous barriers.

The products of reaction are withdrawn through outlet conduit 49 in the top wall 50 of the generator. Outlet means may be disposed about the side walls 35; it is advantageous in some instances to withdraw the products of reaction laterally with respect to the upright porous surfaces. The generator is supported by four legs 55.

It is desirable to provide a shield or baffle for each of the porous refractory walls or tubes in the vicinity of the refractory lining 36 of the generator. To this end, shields or deflectors 51 and 52 extending upwardly throughout the length of the cylindrical porous tubes 40 are used. The shields 51 and 52 embrace only those portions of the porous refractory surfaces not in opposition to an opposed porous refractory surface supplying a complementary reactant and therefore when located at a corner occupy a greater portion of the cylindrical surface than when disposed at an intermediate point. These shields or baffles are of particular significance in the vicinity of any outlet tubes that may be disposed in the side walls 35.

In place of a shield substantially the same effect may be achieved by making the corresponding portions of the tubes impermeable as by coating with a refractory cement. In short, the objective is simply to prevent outward flow of gas through those portions of the refractory barriers which are not opposite a complementary porous surface supplying a second flow of reactant gas. Stated in another way, the porous barriers advantageously discharge only toward open generator zones into which a complementary reactant is flowing and wherein the temperature and other reaction conditions are substantially uniform.

In operation of the last described embodiment, assuming the parts have reached operative temperature as hereinbefore mentioned, natural gas is supplied through inlet header 46 and substantially pure oxygen through inlet header 48 at the relative molar ratio of about 2:1; generally, however, there is used a small excess of oxygen amounting to a few percent over the theoretical ratio of 2:1 for methane and oxygen. The synthesis gas withdrawn from outlet pipe 49 will consist essentially of hydrogen and carbon monoxide in the molar ratio of about 2:1 with usually less than 2-3% of carbon dioxide. As in the previous embodiment, some water vapor or carbon dioxide may be admixed with either the natural gas or oxygen entering the generator.

From the foregoing it will be apparent that the present invention provides a simple and effective gas generator capable of handling relatively large flows of reactant feed under substantially constant and uniform reaction conditions and capable of control within wide ranges for the production of a predetermined synthesis gas. As indicated above, the reaction surfaces of the porous barriers may contain any suitable catalyst or promoter, for example, nickel oxide. The process of surface combustion may also be enhanced where desired by use of any suitable catalyst such as thoria or strontia, either applied to the exterior surfaces of the porous barriers or impregnated in the porous refractory material.

It is impotant to reiterate that the present invention particularly contemplates operation of the gas generation zones as free spaces and unoccupied by catalyst, refractory or any other packing. Within reasonable limits, the space between the opposed porous barrier surfaces defining the generation zone may be varied without disadvantage. In the embodiment shown in Figs. 1 and 2, I prefer to have these barrier surfaces spaced from 1 to 3 inches apart.

From the foregoing it will be apparent that the present invention lends itself substantially without limit to an extremely wide variation in configuration and arrangement of the porous surfaces and to extremely variant shapes and construction of the generator chamber.

It is to be observed that the invention is applicable to the generation of synthesis gas at pressures varying from atmospheric to about 500 pounds per square inch gauge, preferably at about 200 to 300 pounds per square inch gauge. Obviously, the pressure of the gas passing through the barrier must be somewhat higher than the pressure maintained within the reaction zone. The difference in pressure will vary with the porosity and thickness of the barrier and the desired velocity of gas passing therethrough. In general, a pressure difference of 10 to 40 pounds per square inch will suffice, but in some cases lower and higher pressure differences are resorted to in order to establish the desired flow of gas through the porous barrier.

Furthermore, it is advantageous to use oxygen of high purity, usually at least about 80% by volume of oxygen and preferably at least about 95%. The oxygen stream fed to the generator is generally preheated to a temperature of about 600° F. or higher, while the gaseous hydrocarbon stream is fed at a temperature approaching about 1000° F.

In some cases, there will be a tendency for the hydrocarbon stream passing through the porous barrier to deposit carbon within the pores of the barrier. In such cases, it is advisable to switch periodically the flows of the hydrocarbon and oxygen streams so that the oxygen stream passes through the porous barriers in which during a preceding period of operation the hydrocarbon stream deposited some carbon. In this manner, by burning the carbon with oxygen before the carbon accumulates to the point where the pores are plugged, the operation of the generator may be continued substantially uninterrupted for extended periods. When water vapor and/or carbon dioxide are admixed with the hydrocarbon gas, the tendency for carbon deposition in the porous barriers is minimized.

Those skilled in the art are fully cognizant of the difficulties commonly encountered in the operation of conventional synthesis gas generators, particularly generators filled with packing material whether simply refractory or catalytic, because of the formation of free carbon in the course of the reaction yielding synthesis gas. Prominent among the causes of these troubles are the poor mixing of the gaseous reactants and the presence of excessive surface within the generator. It is clear from the specification that the present invention assures uniform mixing of the gaseous reactants and avoids the use of packing material or extensive surface within the zone in which the synthesis gas is generated. Not only does the invention thus make it possible to generate synthesis gas without the formation of free carbon as a by-product but also, where some carbon is formed through poor control or accidental interruption of control of the proportions of the reactants and other factors influencing the generation of synthesis gas, such carbon formation does not have the same serious effect on the operation as in prior processes because the carbon formed is carried out of the generator of the present invention as innocuous particles suspended in the synthesis gas and easily separable therefrom. In prior generators, the carbon tends to build up so that eventually the generator becomes choked and operation is suspended until the carbon is cleaned out. Such stoppages are eliminated by this invention.

Obviously many modifications and variations of the invention will be apparent to those skilled in the art in the light of the foregoing disclosures without any enlargement of the spirit and scope thereof and therefore only such limitations should be imposed as are indicated in the following claims.

I claim:

1. In the generation of synthesis gas from reactants comprising a hydrocarbon gas and oxygen, the steps which comprise passing separate streams of said reactants through spaced and opposed porous barriers into the intervening space which provides a generation zone substantially free of internal packing, maintaining an elevated reaction temperature in said generation zone, permitting the reactant streams to react in said generation zone and withdrawing the products of reaction.

2. In the generation of synthesis gas from reactants comprising a hydrocarbon gas and oxygen, the steps which comprise providing two separate gaseous streams each containing at least one of said reactants in a condition incapable of propagating a flame, said streams jointly containing said reactants in reaction proportions suitable for interaction at high temperature to produce a mixture of hydrogen and carbon monoxide, passing said separate streams through spaced and opposed porous barriers into the intervening space which provides a generation zone substantially free of internal packing, maintaining an elevated reaction temperature in said generation zone, permitting the reactant streams to react in said generation zone to yield essentially hydrogen and carbon monoxide, and withdrawing the products of reaction.

3. A process, as defined in claim 2, wherein an additional reactant of the class consisting of carbon dioxide and water vapor is introduced into the generation zone.

4. In the generation of synthesis gas from reactants comprising a hydrocarbon gas and oxygen, the steps which comprise providing two separate gaseous streams each containing at least one of said reactants in a condition incapable of propagating a flame, said streams jointly containing said reactants in reaction proportions suitable for interaction at high temperature to produce a mixture of hydrogen and carbon monoxide, passing said separate streams through spaced and opposed porous barriers into the intervening space which provides a generation zone substantially free of internal packing, maintaining an elevated reaction temperature in said generation zone, permitting the reactant streams to react in said generation zone to yield essentially hydrogen and carbon monoxide, withdrawing the products of reaction, and periodically switching said separate streams so that each of said streams passes through a porous barrier through which the other of said streams passed during a preceding period of operation.

5. In the generation of a synthesis gas from reactants comprising a hydrocarbon gas and oxygen, the steps which comprise providing separate streams of the hydrocarbon gas and the oxygen in relative ratio suitable for interaction to produce essentially hydrogen and carbon monoxide at an elevated reaction temperature, passing said separate streams through spaced and opposed porous barriers into the intervening space which provides a generation zone substantially free of internal packing, maintaining an elevated reaction temperature in said generation zone, permitting the streams of gas to react in said generation zone and withdrawing the products of reaction from said generation zone.

6. In the generation of a synthesis gas from reactants comprising a hydrocarbon gas and oxygen, the steps which comprise passing a stream of one of said reactant gases through a porous barrier to an opposite surface of said barrier, passing a second stream of the other reactant gas through a second porous barrier to an opposite surface of said second barrier, said barrier surfaces being in spaced opposed relation and defining, together with the intervening space, a generation zone which is substantially free of internal packing, maintaining said generation zone at an elevated temperature and under conditions appropriate for the interaction of the hydrocarbon gas and oxygen, maintaining the respective rate of flow of reactant gas streams through said barriers such that the reactants are supplied in a ratio appropriate for their interaction to produce essentially hydrogen and carbon monoxide, causing the reactant stream to react at the generation zone and withdrawing the products of reaction.

7. In the generation of a synthesis gas from reactants comprising a hydrocarbon gas and oxygen, the steps which comprise passing a stream comprising at least one of said reactant gases in a condition incapable of propagating a flame through a porous barrier to an opposite surface of said barrier, passing a second stream of the other reactant gas through a second porous barrier to an opposite surface of said second barrier, said barrier surfaces being in spaced opposed relation and defining, together with the intervening space, a generation zone which is substantially free of internal packing, maintaining said generation zone at an elevated temperature and under conditions appropriate for the interaction of the hydrocarbon gas and oxygen, maintaining the respective rate of flow of reactant gas streams through said barriers such that the reactants are supplied in a ratio appropriate for their interaction to produce essentially hydrogen and carbon monoxide, causing the reactant streams to react at the generation zone and withdrawing the products of reaction in countercurrent heat exchange relationship to at least one stream of reactant gas.

8. In a gas generator for the production of synthesis gas from reactants comprising a hydrocarbon gas and oxygen, a substantially cylindrical porous refractory barrier; a second coaxially disposed porous refractory barrier of substantially cylindrical configuration having a smaller diameter than the first named barried and disposed inwardly thereof in radially spaced relation whereby to provide an annular space therebetween; means for supplying a stream of reactant gas to the outer surface of said first named barrier; means for supplying a second stream of reactant gas to the inner surface of said second barrier, the opposed surfaces of said barriers together with the intervening space comprising a gas generation zone which is substantially free of internal packing, said gas generation zone being formed as an enclosed, heat-retaining chamber for maintaining an elevated reaction temperature in said gas generation zone; and means for withdrawing gaseous products of reaction.

9. In a gas generator for the production of synthesis gas from reactants, comprising a hydrocarbon gas and oxygen, a generator housing; a substantially cylindrical porous refractory barrier, means associated with the outer surface of said cylindrical porous barrier for supplying a stream of reactant gas to the outer surface of said barrier; a second substantially cylindrical porous refractory barrier of smaller diameter than the first named barrier disposed internally thereof in substantially coaxial relationship with its outer surface in spaced relation to the inner surface of said first named barrier; means for supplying a second stream of reactant gas internally of said second named barrier for passage therethrough to the outer surface thereof, the inner surface of said first named barrier, the outer surface of said second named barrier and the intervening annular space comprising a gas generation zone which is substantially free of internal packing and substantially enclosed to retain heat for maintaining an elevated reaction temperature within said gas generation zone whereby the gases introduced through said porous refractory barriers are subjected to reaction conditions; and means for withdrawing the products of reaction from said gas generation zone.

10. In a gas generator for the production of synthesis gas from reactants comprising a hydrocarbon gas and oxygen, a generator housing; a substantially cylindrical porous refractory barrier; means associated with the outer surface of said cylindrical porous barrier for supplying a stream of reactant gas to the outer surface of said barrier; a second substantially cylindrical porous refractory barrier of smaller diameter than the first named barrier disposed internally thereof in substantially coaxial relationship with its outer surface in spaced relation to the inner surface of said first named barrier; means for supplying a second stream of reactant gas internally of said second named barrier for passage therethrough to the outer surface thereof, the inner surface of said first named barrier, the outer surface of said second named barrier, and the intervening annular space comprising a gas generation zone which is substantially free of internal packing and substantially enclosed to retain heat for maintaining an elevated reaction temperature within said gas generation zone whereby the gases introduced through said porous refractory barriers are subjected to reaction conditions; and means for withdrawing the products of reaction, said last named means directing said products of reaction in indirect heat exchange relation with reactant gas being supplied to at least one of said porous refractory barriers.

11. A generator for the production of synthesis gas from reactants comprising a hydrocarbon gas and oxygen, including a generator housing; a plurality of spaced enclosures within said housing having walls formed of porous refractory material and so disposed that the major portion, at least, of the outer surfaces of said porous walls are disposed opposite similar walls of adjacent enclosures; means for supplying one of said reactant gases to the interior of each alternate enclosure; means for supplying the other reactant gas to the interior of intermediate enclosures whereby said gases pass outwardly through said porous refractory walls to the intervening spaces, the outer surfaces of said porous walls together with the intervening spaces forming a gas generation zone which is substantially free of packing material and substantially enclosed to retain heat for maintaining said gas generation zone at an elevated reaction temperature; and means for withdrawing the products of reaction therefrom.

PAUL W. GARBO.

REFERENCES CITED

The following references are of record in the file of this patent:

UNITED STATES PATENTS

| Number | Name | Date |
|---|---|---|
| 2,254,572 | Harlow | Sept. 2, 1941 |
| 2,431,632 | Brandt | Nov. 25, 1947 |